Figure 1:
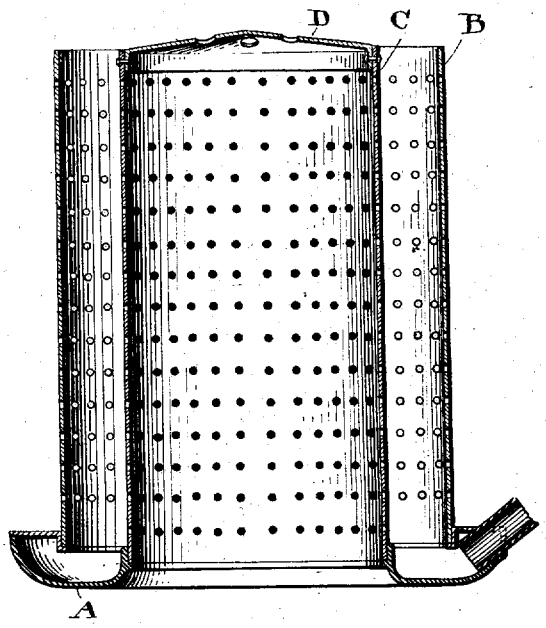

W. R. JEAVONS.

HYDROCARBON BURNER.

No. 11,601. Reissued May 18, 1897.

Attest

R. B. Moser

H. E. Mydra

Inventor

William R. Jeavons

By H. J. Fisher Atty

UNITED STATES PATENT OFFICE.

WILLIAM R. JEAVONS, OF CLEVELAND, OHIO.

HYDROCARBON-BURNER.

SPECIFICATION forming part of Reissued Letters Patent No. 11,601, dated May 18, 1897.

Original No. 463,629, dated November 24, 1891. Application for reissue filed April 8, 1897. Serial No. 631,332.

*To all whom it may concern:*

Be it known that I, WILLIAM R. JEAVONS, a citizen of the United States, residing at Cleveland, in the county of Cuyahoga and State of Ohio, have invented certain new and useful Improvements in Hydrocarbon-Burners; and I do hereby declare that the following is a full, clear, and exact description of the invention, which will enable others skilled in the art to which it appertains to make and use the same.

The primary object of this invention is to produce more perfect combustion of the vapors and gases than has been possible hitherto in burners having combustion-chambers with perforated or foraminous walls. To this end I arrange an air resisting, checking, or impeding device, partition, or plate in connection with the inner tube and so construct or fashion said device, partition, or plate that it will contribute to the perfect combustion of the gases, substantially as hereinafter described.

In this art as developed prior to my invention are found two patents having a bearing thereon—viz., Morrill, No. 44,548, of 1864, and Ewart, No. 261,934, of 1887.

Both of the above patents show combustion-chambers with foraminous walls or tubes, and Morrill shows first a foraminous cap or plate across the top of the inner tube and as a modification a solid plug set into said tube and projecting some considerable distance above the same and above the outer tube as well.

Ewart shows a close or imperforate plate, disk, or diaphragm spanning the inner tube near its top and entirely shutting off all passage of air through the tube to the space above the said plate or diaphragm.

My invention differs from both the foregoing constructions in most essential particulars, as will now appear.

In all burners of this general class, whether of Morrill, Ewart, or my own, vapor is supplied at the base of the combustion-chamber, and air entering through the very fine perforations of the chamber-walls produces a globule of flame at each perforation corresponding more or less to the oxygen admitted. The said perforations are usually arranged as regards size and number to so divide and limit the air passing into the combustion-chamber that nearly all the vapor is converted into carbonic oxid or carbon monoxid, and it is mainly in this form and character that the gases are evolved from the top of the combustion-chamber. Now, having reached this point, the carbonic-oxid gases must combine with one more equivalent of oxygen before complete combustion can occur, and any measure of unconverted vapor that may be present must be converted into carbonic oxid; but other conditions also are met with at this point besides the matter of supplying oxygen to these gases which have to be provided for. Thus, for example, if the inner tube were open its whole length for the upward flow of air there could at best be only a ring of yellow flame, due, probably, to the too-rapid combustion of the measure of unconverted vapor present. If the air were partially cut off, but an equally free flow provided for across the entire plate or cap, as in Morrill above, there would still be a mere ring or flame, and all the gases would be consumed in that ring, and combustion would be stimulated in the top of the combustion-chamber by crowding some of the air into that space beneath the cap. On the other hand, if the air flow from below were entirely cut off, as in Ewart, a manifestly different result would be obtained from either of the other constructions.

Experience has demonstrated that the secret of perfect combustion under the best conditions yet developed in burners of this type lies clearly between these several constructions. It should not be overlooked that the only place where such perfect combustion with a blue flame of symmetrical form can be obtained is at the top of the "combustion-chamber," so called, and not in it; also, that carbonic oxid is evolved and consumed at the top of said chamber and not vapor in its original form. Again, owing to the fact that imperfect constructions are apt to make the combustion-chamber narrower or wider here and there than at other points, and hence give out gases of varying mixture and character, it is necessary to have a place to combine, intermix, or commingle these gases before consuming them, or irregular and imperfect combustion will surely follow. Therefore any construction of burner which does not provide such a place is so materially defective and insufficient that it must fall materially short of good and satisfactory results.

Now applying this test to Morrill above, we see that neither of his constructions makes any such provision. The solid plug shown in Figs. 3 and 4 has the very opposite effect, and would operate as such a reducer of temperature as to render perfect combustion impossible.

The foraminous diaphragm, with its evenly and numerously distributed holes covering the entire end of the inner tube, supplies such volume of oxygen to the space over it that the flame is reduced to a ring about the top of the combustion-chamber, and the combustion necessarily shows such variation in height and character or quality of flame as is naturally induced by the varying widths of the combustion-chamber. The difficulty in this case is, first, that there is an excess of air supplied through the foraminous diaphragm; secondly, that the said air is supplied over the entire surface of the cap to its edge, and, thirdly, that it leaves no mixing-place for the gases.

Ewart has a mixing-place for the gases in the top of his inner tube over the closed disk or plate therein, but is defective in that he leaves a dead cooling-place for the gases in which they drop to a temperature below the combining-point with oxygen. This combining-point is about 800° Fahrenheit, and unless this point is either maintained or produced in the gases they are more or less dissipated by imperfect combustion and given off into the air. My invention anticipates and remedies these defects by means of the peculiar construction of the air resisting, checking, or impeding device, partition, or plate, substantially as shown and described, and particularly pointed out in the claims.

Figure 2:
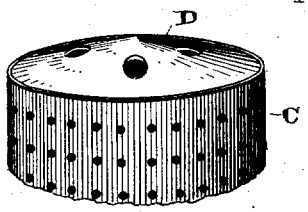

In the accompanying drawings, Figure 1 is a vertical section of a burner in which my improvement is shown in cross-section, and a perspective view of which, in connection with the inner tube alone, appears in Fig. 2.

Figure 3:
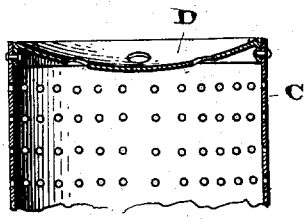

A modification of the invention appears in Fig. 3, in which the check-plate or partition is depressed at the center instead of being raised, as in Fig. 1.

Figure 4:
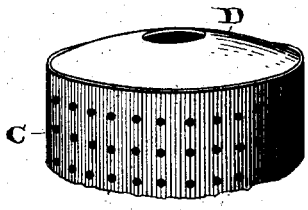

Fig. 4 shows still another modification in which the said plate or partition is oval and has a single opening instead of several, as in the other figures.

Still other modifications might be suggested, but these are supposed to be sufficient to show the nature and scope of the invention.

A represents the burner-base, B the outer burner-tube, and C the inner burner-tube.

D is a device for checking, impeding, or obstructing the passage of air up through the inner tube, so that air will be forced through the perforations of said tube into the combustion-chamber in such suitable proportions as the operations of the burner may require, but also is provided with one or more relatively small air passages or openings at or near its center to supply the requisite volume of air for combustion directly over said plate or device D, as hereinafter fully described. As a distinguishing and novel feature of this device D, it will be seen that while it has these centrally-located openings it has also considerable area or surface outside thereof and about the outer portion of the device, which is imperforate. This construction serves two important purposes. In the first place it affords a free and commodious mixing-space for the gases evolved from the combustion-chamber, which naturally roll inward over this partially "dead space," so called, and commingle and intermix with each other until they cover said space over and upward some distance, and any small measure of uncovered vapor carried to this point will be converted into carbonic oxid. The dead space over the device D therefore serves an important purpose in that it becomes a common mixing-ground for the otherwise unequal and inadequately combined gases; but this still is materially insufficient, because if these gases were allowed to cool at this point below the combining-point with oxygen, as occurs more or less in the case of Ewart cited, there would be imperfect combustion and the unconsumed gases would be given off to vitiate and poison the surrounding atmosphere. Obviously such a burner would be intolerable. Now I have not only remedied this fatal objection to an entirely closed disk, plate, or diaphragm, as Ewart shows, but also provided against the no less fatal defect of a foraminous cap like Morrill, which precludes entirely the mixing of the gases about the top of the inner tube. Now in order that the material advantages of these differences of construction may be better understood reference may be had to the action of the burner. In this action or operation the carbonic oxid and gases eddy over, combine, and commingle above the device or plate D and completely cover and fill said space, even to covering the more or less perforate center of the plate. Combustion then occurs upon the outer surface of this body of gas, but not within the same for the lack of oxygen. There is then no combustion inside this accumulated gas except such as may occur as the result of air supplied through the device or plate D. The hole or holes through this device are relatively small and their size is determined by the volume of heat needed to keep the unconsumed gases up to such temperature that they will combine with oxygen and burn in the presence of a cool utensil, and this is the purpose of having any combustion whatever at this point. The visible effect of admitting air through these openings is a distinct body of flame centrally in the body of the gases and enveloped thereby. This inner enveloped gas-heating flame is designed to be only as large as the gas may need for the purpose described and is distinct and separate from the flame about the outside of the gas, where the complete combustion of the gases occurs. Within this outer envelop of flame the gases are found to be eddying and rolling and intermixing over the device or plate D as their base and support or shield from below, and so it follows that both the complete mixing and combining of the gases and their internal heating are effected by the novel construction of device D, as shown and described. This device may of course have any one of the forms shown or such other form as would operate with like effect or be the equivalent thereof in effect and operation. It will be observed, however, that the imperforate or closed portion of the device D is from about the center thereof to its edge, and in any case the said device must be so constructed as to have a shielded combining-space, as well as an air-supply, substantially as shown and described.

What I claim as new, and desire to secure by Letters Patent, is—

1. In a vapor-burner, a pair of perforated tubes having a combustion-chamber between them and a partition at the top of the inner tube having a passage to allow a limited quantity of air to flow through the same, the said passage being so located and so proportioned relatively to the aggregate area of the perforations in the inner perforated tube, as to produce a diffusion and partial combination of the combustible vapors and air within the burner-flame, substantially as described.

2. A vapor-burner provided with perforated combustion-tubes, in combination with a partition closing the upper end of the inner tube and having one or more air-openings, the said opening or openings being so located and so proportioned relatively to the aggregate area of the perforations in the perforated tube as to promote a diffusion and partial combination of the combustible vapors and air within the burner-flame, substantially as described.

3. A vapor-burner provided with perforated tubes having a mixing-chamber between them, and an air-checking device spanning the inner tube at its upper portion and having one or more air-openings, the aggregate area of the openings in said air-checking device being relatively less than the aggregate area of the perforations in a corresponding area of the inner tube and of such size as to promote a diffusion and partial combination of the gases over said air-checking device substantially as described.

4. The perforated tubes forming a chamber between them, and a device spanning the inner tube constructed to induce the inward flow of the gases from the said chamber over the same and provided with an air way or ways adapted to pass a limited quantity of air to the gases above said device, substantially as described.

5. The perforated tubes forming a chamber between them and a device at the upper portion of the inner tube having a passage or passages adapted to deliver air in such volume as to maintain relatively-limited combustion above said device and a closed area to shield the bodies of combustible gas flowing from the combustion-chamber from currents of air from within the inner tube and permit the said bodies of gas to commingle, substantially as described.

6. The perforated tubes forming a chamber between them, the inner tube provided with a device having an imperforate portion over which the vapor and gases from the said chamber flow and commingle and an air passage or passages to deliver a limited volume of air to said gases over said device, substantially as described.

7. The two perforated tubes, and a closing device at the upper end of the inner tube having a substantially central air passage or passages and closed elsewhere over its surface, substantially as described.

WILLIAM R. JEAVONS.

Witnesses:
H. T. FISHER,
R. B. MOSER.